United States Patent
Gschwind et al.

(10) Patent No.: US 9,292,291 B2
(45) Date of Patent: Mar. 22, 2016

(54) INSTRUCTION MERGING OPTIMIZATION

(75) Inventors: Michael K. Gschwind, Chappaqua, NY (US); Valentina Salapura, Chappaqua, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1030 days.

(21) Appl. No.: 13/432,458

(22) Filed: Mar. 28, 2012

(65) Prior Publication Data

US 2013/0262839 A1    Oct. 3, 2013

(51) Int. Cl.
    G06F 9/30    (2006.01)
    G06F 9/38    (2006.01)

(52) U.S. Cl.
    CPC .......... *G06F 9/30181* (2013.01); *G06F 9/3017* (2013.01); *G06F 9/3836* (2013.01)

(58) Field of Classification Search
    CPC .. G06F 9/3017; G06F 9/30181; G06F 9/3836
    See application file for complete search history.

(56) References Cited

U.S. PATENT DOCUMENTS

| | | | |
|---|---|---|---|
| 6,282,633 B1 | 8/2001 | Killian et al. | |
| 6,338,136 B1 * | 1/2002 | Col et al. | 712/221 |
| 7,398,372 B2 * | 7/2008 | Samra et al. | 712/209 |
| 8,082,430 B2 * | 12/2011 | Valentine et al. | 712/245 |

| | | | |
|---|---|---|---|
| 2004/0139429 A1 | 7/2004 | Ronen et al. | |
| 2005/0289529 A1 | 12/2005 | Almog et al. | |
| 2009/0031120 A1 | 1/2009 | Vaden | |

FOREIGN PATENT DOCUMENTS

CN    86103765 A    12/1986

OTHER PUBLICATIONS

International Search Report No. PCT/IB2013/051341 dated Jul. 18, 2013; pp. 8.

* cited by examiner

*Primary Examiner* — Benjamin Geib
(74) *Attorney, Agent, or Firm* — Cantor Colburn LLP; William A. Kinnaman, Jr.

(57) ABSTRACT

A computer system for optimizing instructions is configured to identify two or more machine instructions as being eligible for optimization, to merge the two or more machine instructions into a single optimized internal instruction that is configured to perform functions of the two or more machine instructions, and to execute the single optimized internal instruction to perform the functions of the two or more machine instructions. Being eligible includes determining that the two or more machine instructions include a first instruction specifying a first target register and a second instruction specifying the first target register as a source register and a target register. The second instruction is a next sequential instruction of the first instruction in program order, wherein the first instruction specifies a first function to be performed, and the second instruction specifies a second function to be performed.

11 Claims, 7 Drawing Sheets

INSTRUCTION MERGING OPTIMIZATION

BACKGROUND

The present invention relates to instruction optimization, and more specifically, to optimizing internal instructions by merging eligible instructions.

Processors execute streams of instructions to perform data processing, storage, and control operations. The processors may execute the instructions by fetching machine instructions from a data storage, generating internal instructions based on the machine instructions, and executing the internal instructions to perform operations to control a system including the processor.

SUMMARY

According to one embodiment of the present disclosure, a computer system for optimizing instructions includes a processor including an instruction execution unit configured to execute instructions and an instruction optimization unit configured to optimize two or more instructions and memory to store two or more machine instructions to be executed by the instruction execution unit. The computer system is configured to perform a method including identifying the two or more machine instructions as being eligible for optimization, wherein the being eligible comprises determining that the two or more machine instructions comprise a first instruction specifying a first target register and a second instruction specifying the first target register as a source register and a target register, wherein the second instruction is a next sequential instruction of the first instruction in program order, wherein the first instruction specifies a first function to be performed, and the second instruction specifies a second function to be performed. The method further includes merging the two or more machine instructions into a single optimized internal instruction that is configured to perform functions of the two or more machine instructions employing operands specified by the two or more machine instructions, wherein the single optimized internal instruction specifies the first target register only as a single target register, wherein the single optimized internal instruction specifies the first and second function to be performed, and executing the single optimized internal instruction to perform the functions of the two or more machine instructions.

According to another embodiment of the present disclosure, a computer program product for implementing instruction optimization includes a tangible storage medium readable by a processing circuit and storing instructions for execution by the processing circuit for performing a method. The method includes determining that at least two machine instructions of an instruction stream are eligible for optimization, wherein the being eligible comprises determining that the at least two machine instructions comprise a first instruction specifying a first target register and a second instruction specifying the first target register as a source register and a target register, wherein the second instruction is a next sequential instruction of the first instruction in program order, wherein the first instruction specifies a first function to be performed, and the second instruction specifies a second function to be performed. The method further includes merging the two or more machine instructions into a single optimized internal instruction that is configured to perform functions of the two or more machine instructions employing operands specified by the two or more machine instructions, wherein the single optimized internal instruction specifies the first target register only as a single target register, wherein the single optimized internal instruction specifies the first and second functions to be performed and executing the single optimized internal instruction to perform the functions of the at least two machine instructions.

According to yet another embodiment of the present disclosure, a computer-implemented method includes determining that two or more instructions of an instruction stream are eligible for optimization, wherein the being eligible comprises determining that the two or more machine instructions comprise a first instruction specifying a first target register and a second instruction specifying the first target register as a source register and a target register, wherein the second instruction is a next sequential instruction of the first instruction in program order, wherein the first instruction specifies a first function to be performed, and the second instruction specifies a second function to be performed. The computer-implemented method further includes merging the two or more machine instructions into a single optimized internal instruction that is configured to perform the first and second functions of the two or more machine instructions employing operands specified by the two or more machine instructions, wherein the single optimized internal instruction specifies the first target register only as a single target register, wherein the single optimized internal instruction specifies the first and second functions to be performed. The computer-implemented method further includes executing the single optimized internal instruction to perform the first and second functions of the two or more instructions.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Figure 1:
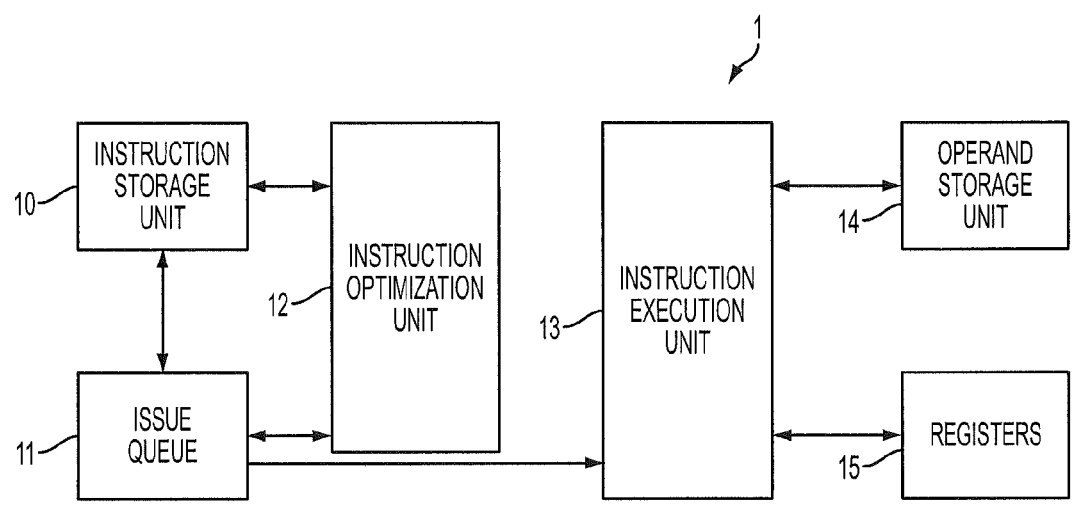
FIG. 1 depicts a block diagram of a system for optimizing instructions according to an embodiment of the present disclosure.

With reference to FIG. 1, a system 1 for optimizing instructions includes an instruction storage unit 10, an issue queue 11, an instruction optimization unit 12, an instruction execution unit 13, an operand storage unit 14, and registers 15. The system 1 is not limited to the above elements or components, but these components are provided for purposes of description. Other components may be added, and one or more of the above components may be omitted according to systems within the scope of the present disclosure.

The instruction storage unit 10 stores instructions to be executed by the instruction execution unit 13. The instructions may be stored in the instruction storage unit 10 according to any architecture, including based on when the instructions were programmed, randomly, based on when the instructions were called or accessed by the system 1, or according to any other design parameters, requirements, or architectures. In one embodiment, the instruction storage unit 10 stores machine instructions, and in another embodiment, the instruction storage unit 10 stores instructions that are generated based on the machine instructions.

The issue queue 11 includes a predetermined number of slots to store instructions that are in-line to be executed by the instruction execution unit 13. The instructions in the issue queue 11 advance through the queue when an instruction at the front of the queue is executed. The advancement of the instructions may be realized by a pointer pointing to a next instruction, by electrically reading the instructions from the queue and re-writing the instructions back into the queue in a new order, or by any other process. In one embodiment, the issue queue 11 stores machine instructions, and in another embodiment, the issue queue stores internal instructions that are generated based on the machine instructions.

In some embodiments of the present disclosure, multiple instructions in the issue queue 11 are analyzed, such as by the instruction execution unit 13, to determine whether a plurality of instructions in the issue queue 11 may be executed in parallel to increase a speed at which the system 1 completes sets of instructions. Analysis of each one of the instructions in the slots of the issue queue 11 takes a predetermined amount of time, such that increasing a depth of the issue queue 11 to increase a number of instructions in the issue queue 11 increases a latency of the system 1.

In embodiments of the present disclosure, the instruction optimization unit 12 analyzes a plurality of instructions in a stream of instructions to determine whether the instructions are eligible for optimization. The stream of instructions may be stored in, and accessed from, the instruction storage unit 10 or the issue queue 11. For example, in one embodiment, machine instructions stored in the instruction storage unit 10 or the issue queue 11 are analyzed to determine whether they are eligible for optimization. If they are determined to be eligible for optimization, the instructions may be optimized to generate an optimized internal instruction, and the optimized internal instruction may be stored in the issue queue 11. In another embodiment, internal instructions stored in the issue queue 11 may be analyzed to determine eligibility for optimization. If the internal instructions are determined to be eligible for optimization, the internal instructions may be optimized to generate an optimized internal instruction, and the optimized internal instruction may be stored in the issue queue 11.

The optimization may occur, for example, at a time when an instruction is decoded. When the instructions are determined to be eligible for optimization, the instruction optimization unit 12 merges the instructions into a single optimized internal instruction that includes separate internal instructions corresponding to the instructions that have been determined to be eligible for optimization. The single optimized internal instruction may be stored in only one slot of the issue queue 11. When performing register renaming, the single optimized internal instruction may use a single target rename register to reflect the result of both the first and second internal instructions that have been combined, thereby reducing consumption of scarce rename register resources.

During execution of the internal instructions, the instruction execution unit 13 accesses an instruction at the front of the issue queue 11 and executes the instruction by accessing one or more operands from an operand storage unit 14 or registers 15 and by storing a result in one or more of the operand storage unit 14 and the registers 15. When the instruction executed by the instruction execution unit 13 is an optimized internal instruction, the instruction execution unit 13 may execute the optimized internal instruction twice—once to execute the first instruction in the optimized internal instruction and again to execute the second instruction in the optimized internal instruction.

Figure 2:
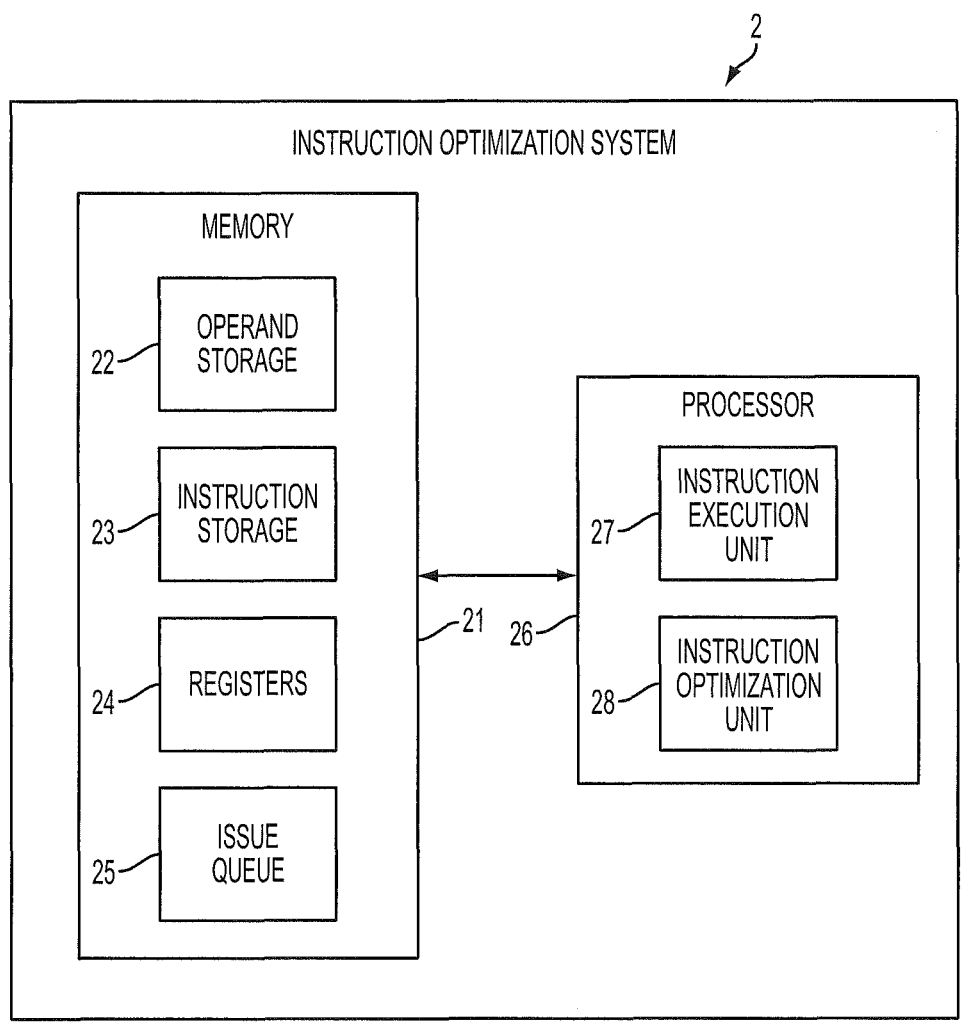
FIG. 2 depicts a configuration of a system for optimizing instructions according to an embodiment of the present disclosure.

FIG. 2 illustrates a physical configuration of a system 2 for optimizing instructions according to an embodiment of the present disclosure. The system 2 includes memory 21 and a processor 26. The memory 21 stores operands in an operand storage 22, instructions in an instruction storage 23, data in registers 24, and internal instructions in the issue queue 25. In embodiments of the present disclosure, the memory 21 may include one memory chip, such as a random access memory (RAM) chip, a plurality of memory chips, different types of memory, such as volatile memory, non-volatile memory, flash memory, cache memory, or any other type of data storage. The operand storage 22, instruction storage 23, registers 24, and issue queue 25 may be located in a same type of memory, in a same memory chip, or in a same integrated circuit. Alternatively, one or more of the operand storage 22, instruction storage 23, registers 24, and issue queue 25 may be located in a different type of memory, a different memory chip, or in a different integrated circuit than another one of the operand storage 22, instruction storage 23, registers 24, and issue queue 25. For example, while the instruction storage 23 may comprise RAM or read-only memory (ROM), the issue queue 25 may comprise cache memory.

The processor 26 includes an instruction execution unit 27 and an instruction optimization unit 28. In embodiments of the present disclosure, the instruction execution unit 27 and the instruction optimization unit 28 may include hard-wired circuitry in the processor 26, software accessed by processing elements of the processor 26 to control operation of the processor 26, one or more arithmetic logic units, other logic, cache memory, or any other circuitry to cause the processor to optimize and execute internal instructions.

Figure 3:
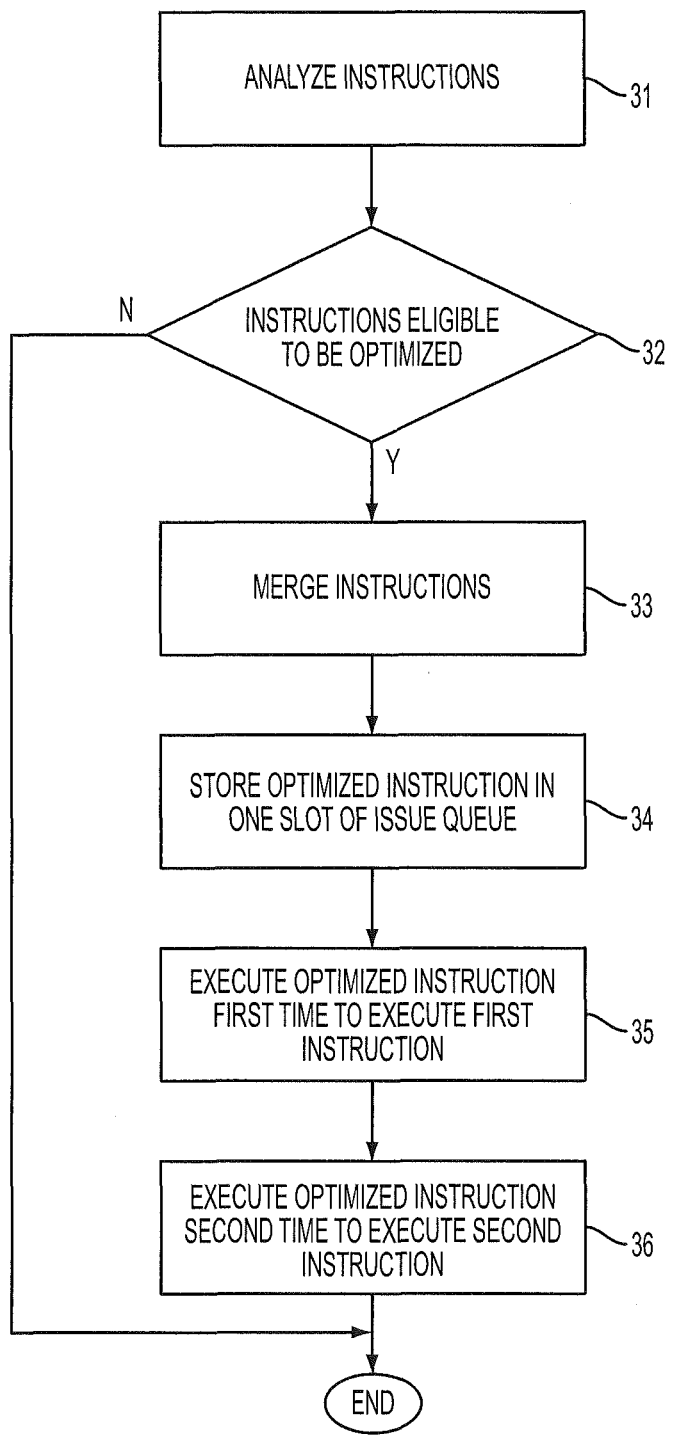
FIG. 3 depicts a process flow for optimizing instructions according to an embodiment of the present disclosure.

FIG. 3 illustrates a method of optimizing instructions according to an embodiment of the present disclosure. The method may be performed in a system 2 having a configuration illustrated in FIG. 2, or in any other system configured to perform the method. It is understood that while blocks 31-36 are illustrated in FIG. 3, embodiments of the present disclosure encompass methods in which one or more of the blocks 31-36 is omitted or modified, or in which additional blocks are added.

Figure 4:
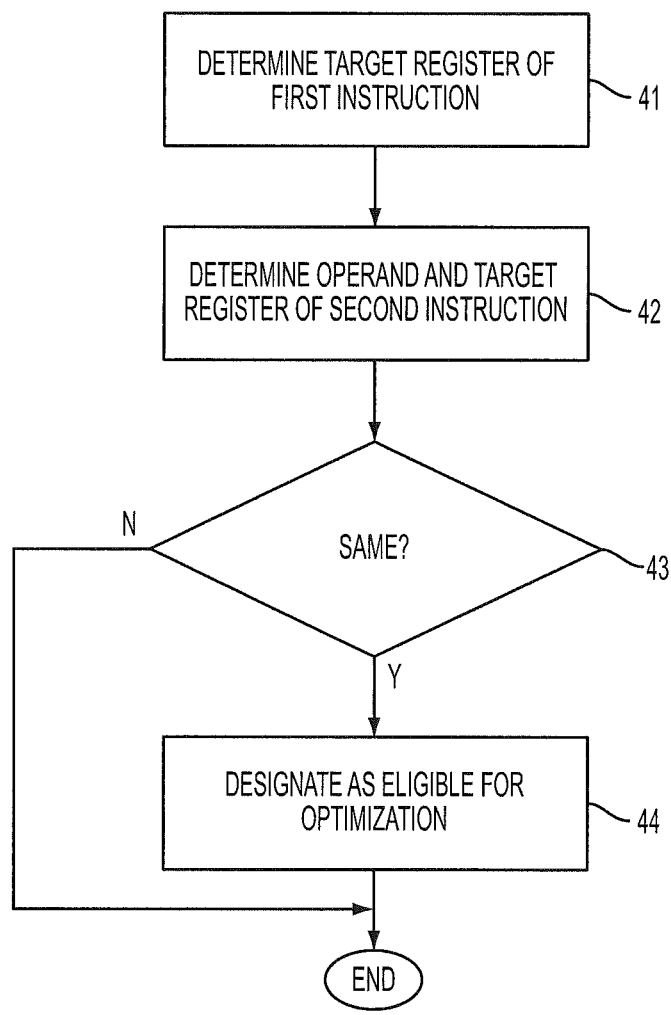
FIG. 4 depicts a process flow for determining whether instructions are eligible for optimization according to one embodiment.

In block 31, a plurality of instructions is analyzed for optimization 31. The analyzed instructions may include machine instructions or internal instructions generated based on the machine instructions. FIG. 4 illustrates one embodiment of determining whether instructions are eligible to be optimized. It is understood that while blocks 41-44 are illustrated in FIG. 4, embodiments of the present disclosure encompass methods in which one or more of the blocks 41-44 is omitted or modified, or in which additional blocks are added. In block 41, a target destination or register of a first instruction is determined. In block 42, a location of an operand and a target destination or register of a second instruction is determined.

In block 43, it is determined whether the target destination or register of the first and second instructions is the same, and whether the target destination or register is the same as the location of an operand of the second instruction. If so, in block 44 the instructions are designated as being eligible for optimization. If the first and second internal instructions are not eligible for optimization based on the analysis of block 43, then the process ends.

Although the embodiment of FIG. 4 describes determining whether instructions are eligible for optimization based on a destination register of the operations, other criteria may determine whether instructions are eligible for optimization. In particular, instructions may be eligible for optimization any time an accurate execution of the second instruction depends upon the outcome of the first instruction. For example, if a second operation uses data in a register written to by a first operation and writes to that register, then performing the second operation prior to performing the first operation may generate a faulty result in the second operation. Since the second operation depends upon the execution of the first operation, the operations may be eligible to be optimized.

In one embodiment, the first and second instructions are adjacent to each other in the issue queue, such that one would be executed immediately after the other if executed in order from first to last in the issue queue. In one embodiment, only the source of the operand of the second instruction is compared to the target register or destination of the first instruction. In another embodiment, only the target destination or register of the second instruction is compared to the target register or destination of the first instruction.

In one embodiment, the operands locations and target destinations or registers of the instructions in the issue queue may be analyzed, and the first and second instructions may be determined to be eligible for optimization when no instruction between the first instruction and the second instruction in the issue queue writes to an operand location accessed by the second instruction, and no instruction between the first instruction and the second instruction in the issue queue reads from the target destination or register of the first instruction.

In one embodiment, a determination may be made whether the instructions are of types that are eligible to be combined. For example, in one embodiment with multiple issue queues, instructions may only be combined if they are issued from the same issue queue. Thus, in one embodiment, vector instructions and floating point instructions may be combined with one another, and integer instruction may be combined, but not integer and vector instructions. Similarly, issue logic may restrict other combinations of instructions.

Referring again to FIG. 3, if it is determined in operation 32 that the analyzed instructions are eligible to be optimized, the instructions are merged in operation 33 to form one optimized internal instruction including the instruction information of each of the analyzed instructions. The optimized internal instruction may be arranged according to predetermined programming parameters such that an instruction executing device recognizes the first portion of the optimized internal instruction as being a first instruction to be executed first, and the second portion of the optimized internal instruction as being a second instruction to be executed second.

In one embodiment, the analyzed instructions are machine instructions, and merging the instructions includes performing a register rename process and generating internal instructions corresponding to the machine instructions to generate the optimized internal instruction. In another embodiment, the analyzed instructions may be internal instructions, so that merging the instructions does not require converting the instructions into internal instructions prior to generating the optimized internal instruction.

In operation 34, the optimized internal instruction is stored as one internal instruction. For example, when an issue queue 11 has a plurality of slots and each slot is configured to store one internal instruction, the optimized internal instruction may be stored in only one slot in the issue queue 11. Accordingly, when a processor analyzes internal instructions in the issue queue to determine whether to execute multiple internal instructions in parallel, the optimized internal instruction corresponds to only one instruction analyzed by the processor.

In some embodiments, a width of the issue queue is increased to accommodate optimized internal instructions having a larger width than separate first and second internal instructions. In some embodiments, a depth of the issue queue, or a number of slots in the issue queue, is decreased relative to an issue queue having a width corresponding only to a single instruction, as opposed to an optimized internal instruction, to maintain a total data size of the issue queue. In such an embodiment, a time for the processor to analyze all the slots in the issue queue is decreased, since the issue queue includes fewer slots. However, since one or more of the internal instructions is an optimized internal instruction, the processor is able to analyze a same number of internal instructions in spite of the decreased number of slots.

In another embodiment, the depth of the issue queue is maintained the same as the depth of the issue queue having a width corresponding to only a single instruction, such that a processor analyzing the internal instructions in the slots of the issue queue is able to analyze an increased number of total internal instructions in the same number of slots due to one or more of the slots having optimized internal instructions.

In one embodiment, placing the optimized internal instruction into the issue queue is performed in conjunction with performing register renaming on the named logical register operands in the internal instructions of the optimized internal instruction. In one embodiment a register renaming process is performed by allocating only a single target rename register to store the result of the first internal instruction and the second internal instruction of the optimized internal instruction, where the target register of the first internal instruction is the same as the target register of the second internal instruction, or where the target register of the first internal instruction is the same as the source register of an operand of the second internal instruction.

In at least one embodiment, when the second internal instruction having been combined into an optimized internal instruction reads the result of the first internal instruction of the optimized internal instruction, the common target register is not named as a source register and represents an additional implicit operand that is not stored in the optimized internal instruction separately as a source operand, but which is supplied as a source operand to the second internal instruction when the second internal instruction is executed, or when a portion of the optimized internal instruction corresponding to the second internal instruction is executed.

In operation 35, a first internal instruction of the optimized internal instruction is executed. A processor may read the optimized internal instruction and may recognize first and second internal instructions located within the optimized internal instruction. The first and second internal instructions may be arranged in such a way as to have an order of execution recognized by the processor. For example, in one embodiment, a code corresponding to a first internal instruction may be located in more significant bits relative to a code corresponding to a the second internal instruction.

In operation 36, the second internal instruction of the optimized internal instruction is executed after executing the first instruction. In embodiments of the present disclosure, the first and second internal instructions are executed in the same order in which the internal instructions were arranged in an instruction stream prior to being merged into the optimized internal instruction. For example, if the first internal instruction is upstream from the second internal instruction, indicating that the first internal instruction would be executed first if the internal instructions were executed in order, then the first internal instruction would be executed first in the optimized internal instruction.

In one embodiment, first and second machine instructions are optimized to generate the optimized internal instruction, and the first and second internal instructions are executed in blocks 35 and 36 by generating first and second internal instructions from the optimized internal instruction corresponding to the first and second machine instructions and executing the first and second internal instructions separately, such as in separate operation cycles. In another embodiment, first and second internal instructions are optimized to form the optimized internal instruction to be stored as a single instruction, and the optimized internal instruction is executed by generating the first and second internal instructions and executing the first and second internal instructions separately, such as in separate operation cycles.

In yet another embodiment, the first and second internal instructions are executed in blocks 35 and 36 by executing the optimized internal instruction twice, where the optimized internal instruction includes a first internal instruction portion corresponding to the first internal instruction and a second internal instruction portion corresponding to the second internal instruction. In this embodiment, the first internal instruction portion is executed the first time the optimized internal instruction is executed, and the second internal instruction portion is executed the second time the optimized internal instruction is executed.

In yet another embodiment, the first and second internal instructions are executed in blocks 35 and 36 by executing the optimized internal instruction once instead of generating two separate internal instructions. In this embodiment, the optimized internal instruction includes a first internal instruction portion corresponding to the first internal instruction and a second internal instruction portion corresponding to the second internal instruction, and the second internal instruction portion is executed immediately after the first internal instruction portion without generating separate internal instructions.

Embodiments of the present disclosure encompass any instruction set architecture, including reduced instruction set computing (RISC) and complex instruction set computing (CISC). For example, in embodiments related to a RISC architecture, the first instruction may be a load instruction, and the second instruction may be a data processing operation to act on a result of the first instruction, such as an arithmetic instruction. On the other hand, in embodiments related to a CISC architecture, the first instruction may be any instruction type, including an arithmetic instruction, and the second instruction may be any instruction type, including an arithmetic instruction.

Figure 5:
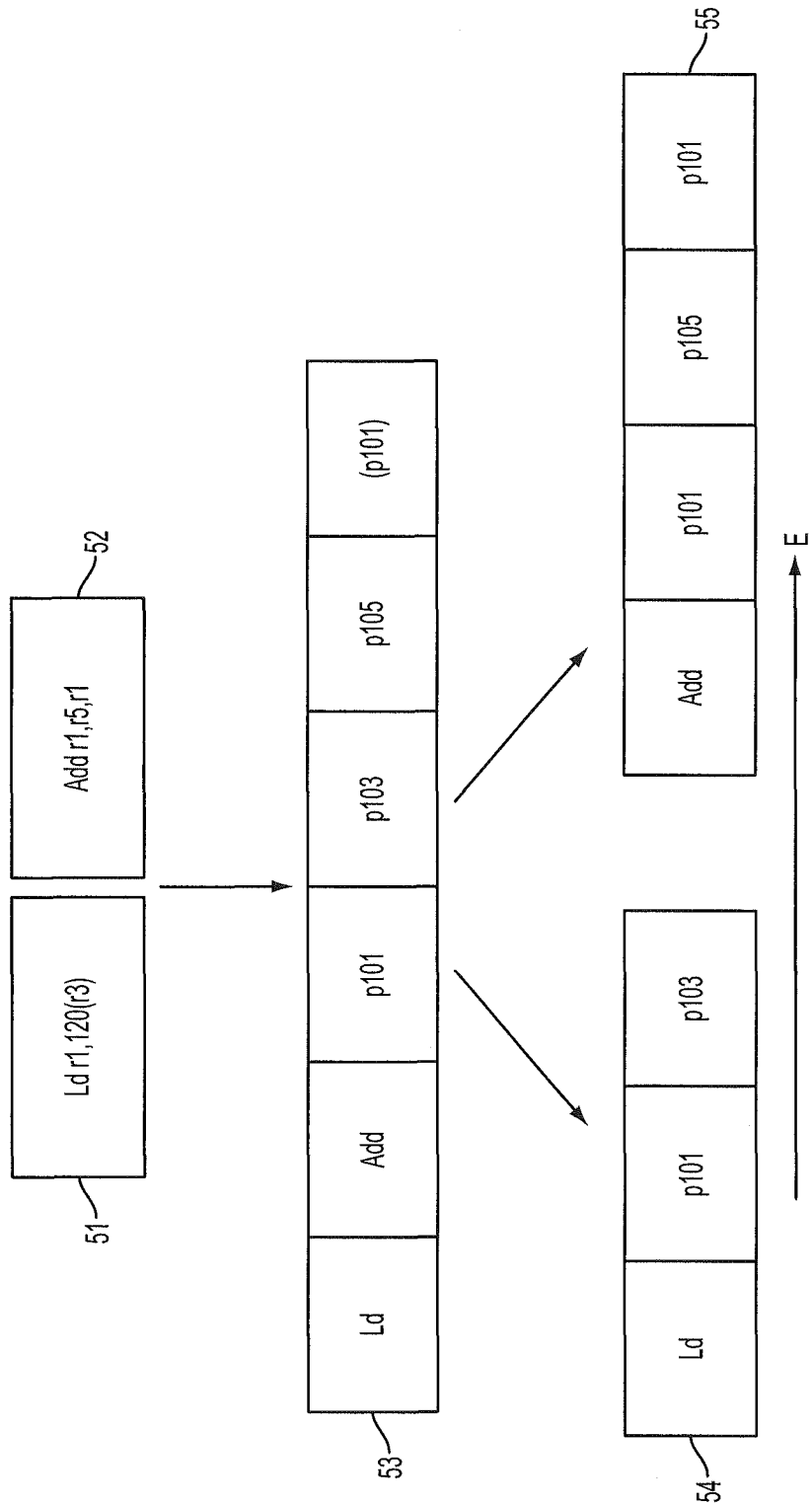
FIG. 5 depicts graphically the optimization and execution of instructions according to one embodiment of the disclosure.
Figure 6:
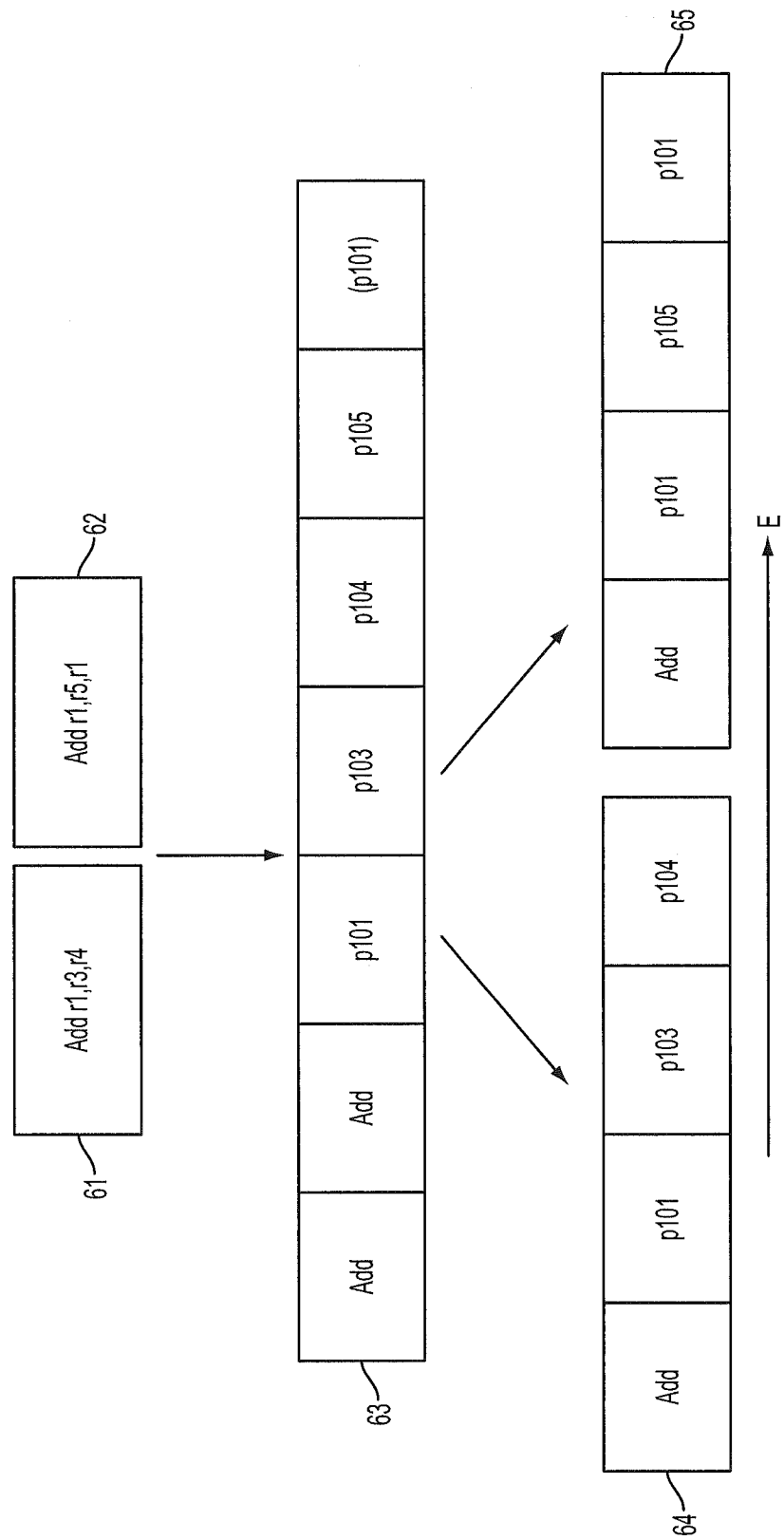
FIG. 6 depicts graphically the optimization and execution of instructions according to another embodiment of the disclosure.

FIGS. 5 and 6 illustrate examples of merging instructions to form an optimized internal instruction, and executing the optimized internal instruction or separate internal instructions, according to embodiments of the present disclosure. Referring to FIG. 5, first and second machine instructions 51 and 52 are analyzed to determine whether they may be optimized. The first machine instruction 51 is configured to control a processor to load a value into register r1 based on an address at register r3 and a constant, 120. The second machine instruction 52 is configured to control a processor to load a value into register r1 based on the sum of the contents of registers r1 and r5.

When it is determined that the first and second machine instructions 51 and 52 are eligible to be optimized, the first and second machine instructions 51 and 52 are merged to form the optimized internal instruction 53. It is understood that although additional processes, such as a register rename process, are omitted from the depiction in FIG. 5, additional processes may be included or inherent in the optimization and execution of the machine instructions 51 and 52. The optimized internal instruction 53 includes internal instruction portions corresponding to each of the first and second machine instructions 51 and 52.

FIG. 5 shows the optimized internal instruction 53 after register renaming has been performed, replacing logical register specifiers r1, r3, and r5 with physical rename registers p101, p103 and p105, respectively. In particular, the optimized internal instruction 53 includes internal instructions to load to physical location 101, corresponding to register r1, a value corresponding to an address at physical location p103, corresponding to the register r3 plus the constant, 120. The optimized internal instruction 53 further includes internal instructions to add the contents of physical location p105, corresponding to register r5, with the contents of physical location p101, corresponding to the register r1, and to store the contents in physical location p101.

For example, in embodiments in which the first and second machine instructions 51 and 52 are eligible for optimization only when the second machine instruction 52 accesses and replaces the data from the same register as the destination register of the first machine instruction 51, the optimized internal instruction 53 may omit the operand data p101 (the omitted data indicated by parentheses) at the end of the second instruction portion of the optimized internal instruction 53, thereby reducing a size of the optimized internal instruction 53.

Although one embodiment of an optimized internal instruction 53 is illustrated in FIG. 5, it is understood that embodiments of the present disclosure encompass optimized internal instructions having different contents and organization. For example, in one embodiment, a separate data location may be provided for the destination or register of the second operation of the optimized internal instruction. In another embodiment, a separate data location may be provided for each operand of the second operation of the optimized internal instruction, regardless of whether the operand is the same as the target destination or register of the first instruction portion.

In one embodiment of the present disclosure, the optimized internal instruction 53 is executed by executing two separate internal instructions 54 and 55. A first internal instruction 54 may correspond to the first machine instruction 51, and a second internal instruction 55 may correspond to the second machine instruction 52. The first and second internal instructions 54 and 55 are executed in the same order as the first and second machine instructions 51 and 52 would have been executed based on the original positions of the first and second machine instructions 51 and 52 in an instruction stream, as indicated by the arrow E.

In one embodiment, executing the first and second internal instructions 54 and 55 includes dividing the optimized internal instruction 53 into separate internal instructions 54 and 55 and executing each of the separate internal instructions 54 and 55 in separate operation cycles. In another embodiment, executing the first and second internal instructions 54 and 55 includes executing the optimized internal instruction 53 twice, executing the first portion of the optimized internal instruction 53 that corresponds to the first internal instruction 54 the first time the optimized internal instruction 53 is optimized, and executing a second portion of the optimized internal instruction 53 corresponding to the second internal instruction 55 the second time the optimized internal instruction 53 is executed.

In one embodiment, one or both of an operand source location and a destination location is omitted from the second portion of the optimized internal instruction 53 corresponding to the second internal instruction 55, and a processor, such as the instruction execution unit 27 of FIG. 2, supplies the destination location of the first portion of the optimized internal instruction 53 corresponding to the first internal instruction 54 as one or both of the omitted operand source location and destination location of the second internal instruction 55.

FIG. 6 illustrates an embodiment in which the first and second internal instructions 61 and 62 each correspond to arithmetic operations. It is understood by those skilled in the art that internal instructions as illustrated in FIG. 6 correspond to a complex architecture, such as a CISC architecture, in which an arithmetic operation takes up one line of assembly, and not a RISC architecture, which separates operations to have each operation take only one clock cycle, so that performing an arithmetic operation would also necessarily include performing a load operation, for example.

The first machine instruction 61 is configured to control a processor to add the contents of registers r3 and r4 and to load the result in register r1. The second machine instruction 62 is configured to control a processor to add the contents of registers r5 and r1 into register r1. When it is determined that the first and second machine instructions 61 and 62 are eligible to be optimized, the first and second machine instructions 61 and 62 are merged to form the optimized internal instruction 63. The optimized internal instruction 63 includes first and second portions corresponding to both the first machine instruction 61 and the second machine instruction 62. In one embodiment of the present disclosure, the optimized internal instruction 63 is stored in only one storage slot of an issue queue.

When the complex internal instruction is executed, as indicated by the arrow E, the optimized internal instruction may be divided into a first internal instruction 64 and a second internal instruction 65. The first internal instruction 64 may be executed prior to the second internal instruction 65, which maintains the order of execution of the first and second internal instructions 64 and 65 relative to the first and second machine instructions 61 and 62.

In one embodiment, executing the first and second internal instructions 64 and 65 includes dividing the optimized internal instruction 63 into separate internal instructions 64 and 65 and executing each of the separate internal instructions 64 and 65 in separate operation cycles. In another embodiment, executing the first and second internal instructions 64 and 65 includes executing the optimized internal instruction 63 twice, executing the first portion of the optimized internal instruction 63 that corresponds to the first internal instruction 64 the first time the optimized internal instruction 63 is optimized, and executing a second portion of the optimized internal instruction 63 corresponding to the second internal instruction 65 the second time the optimized internal instruction 63 is executed.

In yet another embodiment, the optimized internal instruction 63 is executed instead of generating the first and second internal instructions 64 and 65 and executing the first and second internal instructions 64 and 65 in sequence. In other words, an instruction execution unit 27 of a processor 26 may be configured to recognize the optimized internal instruction 63 as comprising multiple functions and to execute the multiple functions in sequence instead of generating separate internal instructions 64 and 65 to correspond to the separate functions.

In one embodiment, one or both of an operand source location and a destination location is omitted from the second portion of the optimized internal instruction 63 corresponding to the second internal instruction 65, and a processor, such as the instruction execution unit 27 of FIG. 2, supplies the destination location of the first portion of the optimized internal instruction 63 corresponding to the first internal instruction 64 as one or both of the omitted operand source location and destination location of the second internal instruction 65.

In one embodiment of the present disclosure, executing the optimized internal instruction 63 may include executing the functions of the first and second machine instructions 61 and 62, in particular the "add" function, in sequence without performing a store operation at the end of the portion of the optimized internal instruction 63 corresponding to the first internal instruction 64 or a load operation at a beginning of the portion of the optimized internal instruction 63 corresponding to the second internal instruction 64. In other words, referring to FIG. 6 by way of example, in an operation in which two arithmetic functions are provided by the first and second machine instructions 61 and 62, optimization may include skipping the "store" to register p101 of internal instruction 64 and "load" from register p101 of the internal instruction 65, and instead, a processor may combine the first and second add functions (p103+p104+p105) to execute the optimized internal instruction 63.

Figure 7:
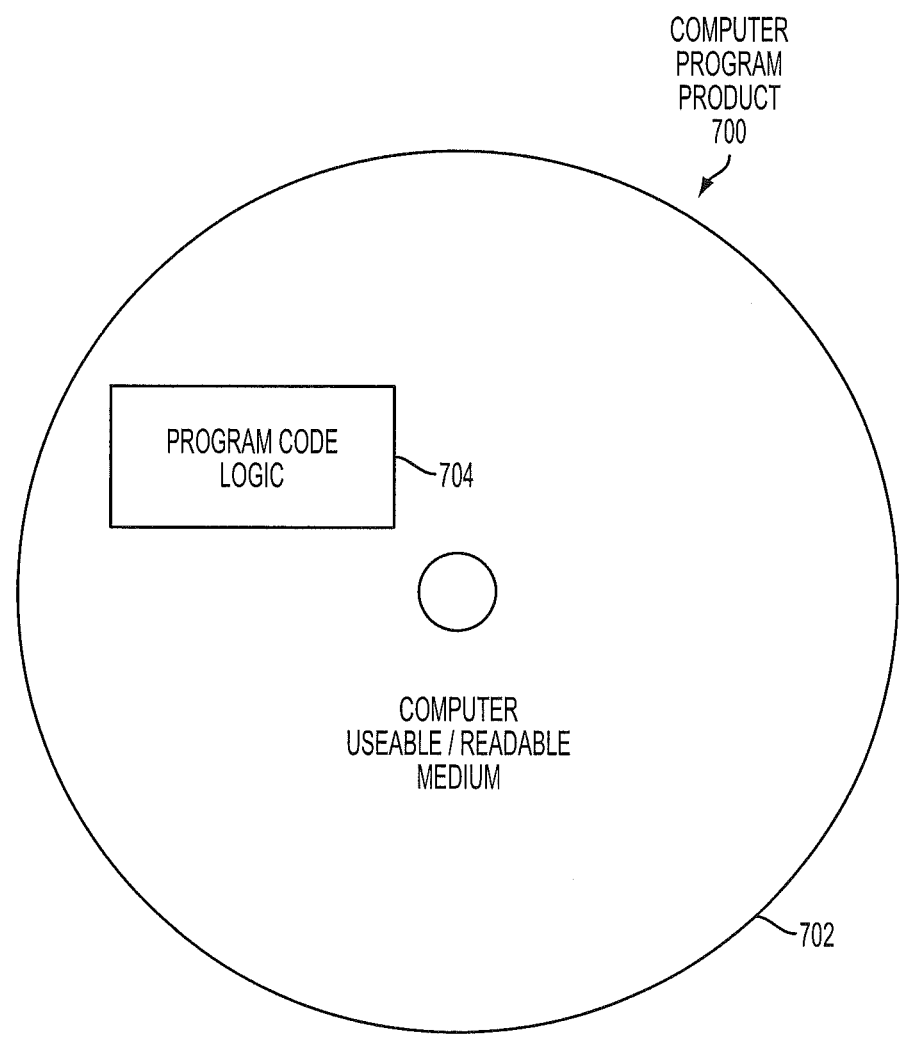
FIG. 7 depicts a computer program product in accordance with one embodiment.

As described above, embodiments can be embodied in the form of computer-implemented processes and apparatuses for practicing those processes. An embodiment may include a computer program product 700 as depicted in FIG. 7 on a computer readable/usable medium 702 with computer program code logic 704 containing instructions embodied in tangible media as an article of manufacture. Exemplary articles of manufacture for computer readable/usable medium 702 may include floppy diskettes, CD-ROMs, hard drives, universal serial bus (USB) flash drives, or any other computer-readable storage medium, wherein, when the computer program code logic 704 is loaded into and executed by a computer, the computer becomes an apparatus for practicing the invention. Embodiments include computer program code logic 704, for example, whether stored in a storage medium, loaded into and/or executed by a computer, or transmitted over some transmission medium, such as over electrical wiring or cabling, through fiber optics, or via electromagnetic radiation, wherein, when the computer program code logic 704 is loaded into and executed by a computer, the computer becomes an apparatus for practicing the invention. When implemented on a general-purpose microprocessor, the computer program code logic 704 segments configure the microprocessor to create specific logic circuits.

Technical effects and benefits of embodiments of the present disclosure include reducing a number of instructions analyzed by a processor for processes such as parallel processing, reducing a number of internal instructions stored in memory, such as in an issue queue, and reducing a number of steps performed by a processor to execute internal instructions. For example, in an embodiment in which a processor is configured to perform parallel processing, and the processor analyzes instructions in a stream of instructions stored in an instruction queue or in an issue queue, the processor may form optimized internal instructions according to above-described embodiments to result in fewer internal instructions for the processor to analyze for parallel processing, reducing latency in a system including the processor. Other technical effects and benefits may result from systems, methods, and computer program products according to embodiments of the present disclosure, and the scope of the invention is not limited to any one of the above effects or benefits.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The above embodiments were chosen and described in order to best explain the principles of the invention and the practical application, and to enable others of ordinary skill in the art to understand the invention for various embodiments with various modifications as are suited to the particular use contemplated.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or schematic diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

As described above, embodiments can be embodied in the form of computer-implemented processes and apparatuses for practicing those processes. In embodiments, the invention is embodied in computer program code executed by one or more network elements. Embodiments include a computer program product on a computer usable medium with computer program code logic containing instructions embodied in tangible media as an article of manufacture. Exemplary articles of manufacture for computer usable medium may include floppy diskettes, CD-ROMs, hard drives, universal serial bus (USB) flash drives, or any other computer-readable storage medium, wherein, when the computer program code logic is loaded into and executed by a computer, the computer becomes an apparatus for practicing the invention. Embodiments include computer program code logic, for example, whether stored in a storage medium, loaded into and/or executed by a computer, or transmitted over some transmission medium, such as over electrical wiring or cabling, through fiber optics, or via electromagnetic radiation, wherein, when the computer program code logic is loaded into and executed by a computer, the computer becomes an apparatus for practicing the invention. When implemented on a general-purpose microprocessor, the computer program code logic segments configure the microprocessor to create specific logic circuits.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer program product for implementing instruction optimization, the computer program product comprising:
   a non-transitory storage medium readable by a processing circuit and storing instructions for execution by the processing circuit for performing a method comprising:
      determining that at least two machine instructions of an instruction stream are eligible for optimization, wherein the being eligible comprises determining that the at least two machine instructions comprise a first instruction specifying a first target register and a second instruction specifying the first target register as a source register and a target register, wherein the second instruction is a next sequential instruction of the first instruction in program order, wherein the first instruction specifies a first function to be performed, and the second instruction specifies a second function to be performed;
      merging the two or more machine instructions into a single optimized internal instruction that is configured to perform functions of the two or more machine instructions employing operands specified by the two or more machine instructions, wherein the single optimized internal instruction specifies the first target register only as a single target register, wherein the single optimized internal instruction specifies the first and second functions to be performed, and the single optimized internal instruction stored in a single slot in an issue queue; and
      executing the single optimized internal instruction to perform the functions of the at least two machine instructions the executing including executing the first instruction followed by the second instruction.

2. The computer program product of claim 1, wherein executing the single optimized internal instruction includes executing the single optimized internal instruction instead of executing at least two internal instructions corresponding to the at least two machine instructions.

3. The computer program product of claim 1, wherein the method further comprises storing the single optimized internal instruction as a single instruction in the tangible storage medium, and
   wherein executing the single optimized internal instruction includes generating at least two internal instructions corresponding to the at least two machine instructions and executing the at least two internal instructions in separate operations.

4. A computer system for optimizing instructions, the computer system comprising:
   a processor including an instruction execution unit configured to execute instructions and an instruction optimization unit configured to optimize two or more instructions; and
   memory to store two or more machine instructions to be executed by the instruction execution unit,
   the computer system configured to perform a method comprising:
      identifying the two or more machine instructions as being eligible for optimization, wherein the being eligible comprises determining that the two or more machine instructions comprise a first instruction specifying a first target register and a second instruction specifying the first target register as a source register and a target register, wherein the second instruction is a next sequential instruction of the first instruction in program order, wherein the first instruction specifies a first function to be performed, and the second instruction specifies a second function to be performed;
      merging the two or more machine instructions into a single optimized internal instruction that is configured to perform functions of the two or more machine instructions employing operands specified by the two or more machine instructions, wherein the single optimized internal instruction specifies the first target register only as a single target register, wherein the single optimized internal instruction specifies the first and second function to be performed, and the single optimized internal instruction stored in a single slot in an issue queue; and
      executing the single optimized internal instruction to perform the functions of the two or more machine instructions, the executing including executing the first instruction followed by the second instruction.

5. The computer system of claim 4, wherein the computer system is configured to execute the single optimized internal instruction instead of executing two or more internal instructions corresponding to the two or more machine instructions.

6. The computer system of claim 4, wherein the method further comprises:
   executing the optimized internal instruction in two or more separate operation cycles to execute the functions of each of the two or more machine instructions.

7. The computer system of claim 4, wherein the execution unit is configured to execute the optimized internal instruction by generating two or more separate internal instructions corresponding to the two or more machine instructions and to execute each of the two or more separate internal instructions in separate operation cycles.

8. The computer system of claim 4, wherein internal instructions of the two or more machine instructions are stored in an issue queue, wherein the merging is performed on the internal instructions of the two or more machine instructions, further comprising:
   replacing at least one of the internal instructions in the issue queue with the single optimized internal instruction to be executed.

9. The computer system of claim 4, wherein the processor is configured to perform register renaming by allocating a single target register to represent a result of both the first and second ones of the two or more machine instructions.

10. The computer system of claim 9, wherein the single optimized internal instruction includes only one stored rename register identifier to identify both a target register of a first internal instruction and a source register of a second internal instruction, the first and second internal instructions corresponding to first and second machine instructions of the two or more machine instructions, and
   executing the single optimized internal instruction comprises:
      selecting the target register of the first internal instruction as a source register of the second internal instruction.

11. The computer system of claim 4, wherein a first one of the two or more machine instructions is a memory load instruction and a second one of the two or more machine instructions is a data processing instruction for processing data from the memory load instruction.

\* \* \* \* \*